United States Patent
Reagh

(10) Patent No.: US 6,732,548 B2
(45) Date of Patent: May 11, 2004

(54) ORNAMENTAL GLASS OBJECT AND METHOD OF FABRICATION

(76) Inventor: Valentine H. Reagh, 8324 Colegio Dr., Los Angeles, CA (US) 90045

( * ) Notice: Subject to any disclaimer, the term of this patent is extended or adjusted under 35 U.S.C. 154(b) by 159 days.

(21) Appl. No.: 09/902,674

(22) Filed: Jul. 12, 2001

(65) Prior Publication Data

US 2003/0010063 A1 Jan. 16, 2003

(51) Int. Cl.[7] ............................................. C03B 23/20
(52) U.S. Cl. ........................................................ 65/42
(58) Field of Search ............................ 65/36, 42, 17.1, 65/DIG. 10; 428/141, 143, 149, 641, 32, 67, 325

(56) References Cited

U.S. PATENT DOCUMENTS

| | | | | |
|---|---|---|---|---|
| 477,990 | A | * 6/1892 | Carter et al. | 428/38 |
| 2,626,985 | A | * 1/1953 | Gates | 257/41 |
| 3,860,405 | A | * 1/1975 | Coucoulas et al. | 65/42 |
| 4,342,611 | A | * 8/1982 | Tuttle | 156/63 |
| 5,525,137 | A | * 6/1996 | DiCarlo | 65/17.6 |
| 5,552,933 | A | * 9/1996 | Beauchamp | 359/515 |
| 5,989,666 | A | * 11/1999 | Hadden | 428/38 |
| 6,378,336 | B1 | * 4/2002 | Jeon | 65/17.3 |

FOREIGN PATENT DOCUMENTS

DE  3321711 A1 * 12/1984 ........... C03C/27/00

OTHER PUBLICATIONS

"For your Home", stainedglassart.com, copyright 1992–2003 [Retrieved on Dec. 2, 2003].*
"the fusing and slumping tutorial", warmglass.com, copyright 1999–2003 [Retrieved on Dec. 2, 2003].*

* cited by examiner

Primary Examiner—Steven P. Griffin
Assistant Examiner—Carlos Lopez
(74) Attorney, Agent, or Firm—Timothy Thut Tyson; Ted Masters; Freilich, Hornbaker & Rosen

(57) ABSTRACT

An ornamental glass object and method of fabrication (20) includes three separate glass elements which are combined in three separate heating operations. A foundation of base glass (22) is formed and partially melted at a high temperature smoothing the edges. Stringer glass (26) and chip glass (28) are combined to form a pattern (30) which is melted at a second intermediate temperature to fuse all elements of the pattern (30) together. Fused pattern (30) is then combined with melted base glass (22) and the combination heated at a third low temperature to bond pattern (30) to base glass (22).

13 Claims, 6 Drawing Sheets

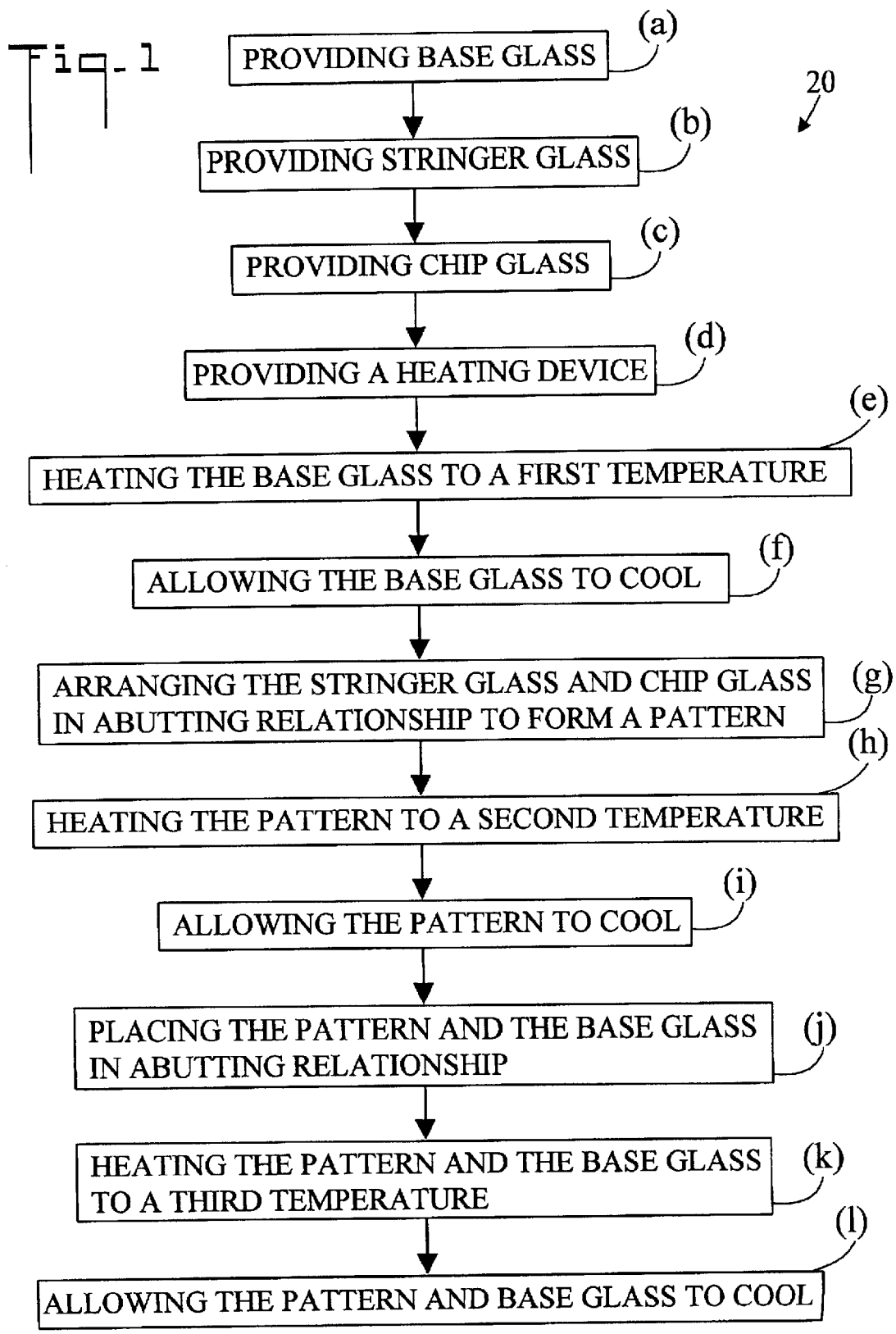

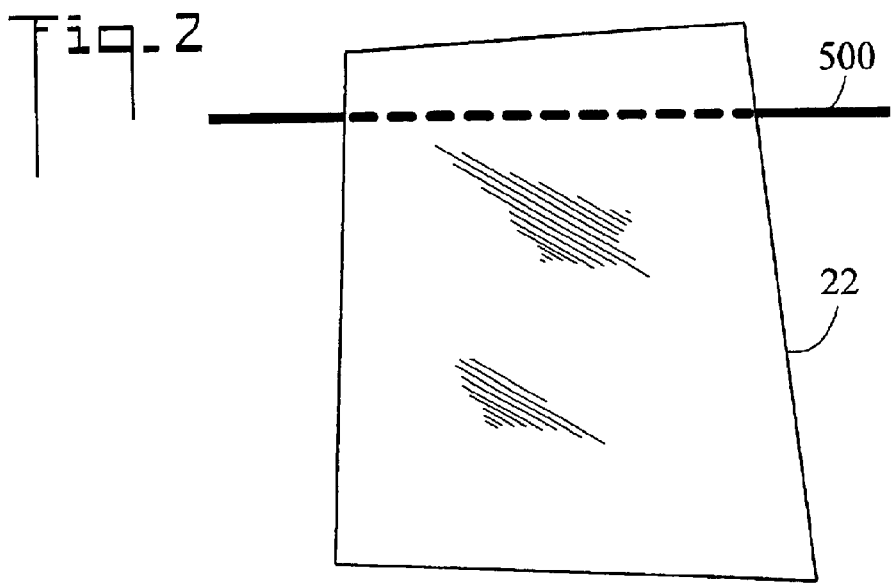
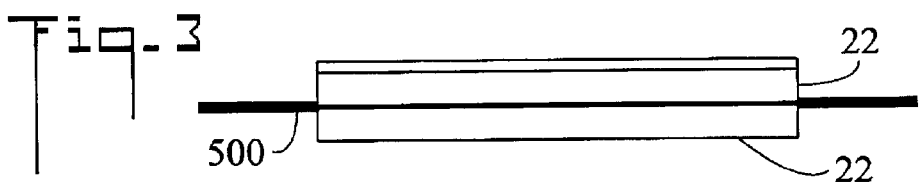
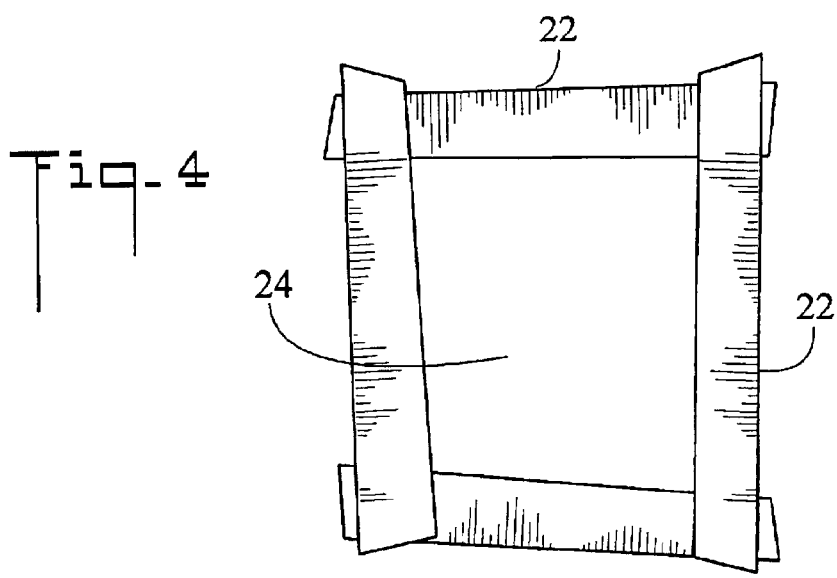
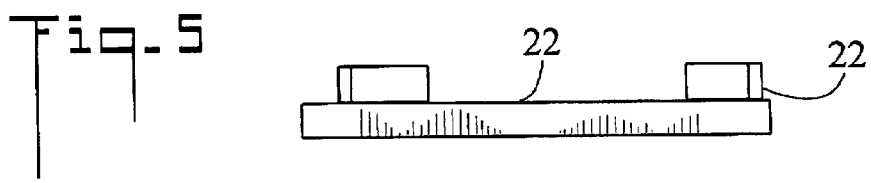

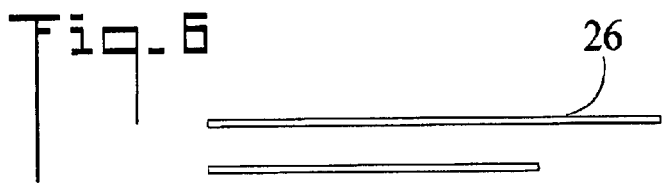
Fig_6
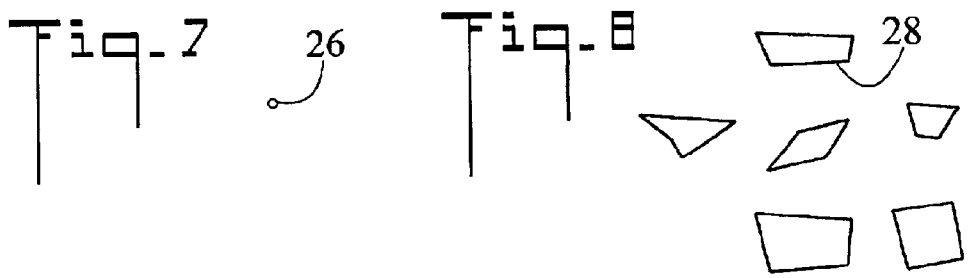
Fig_7   Fig_8
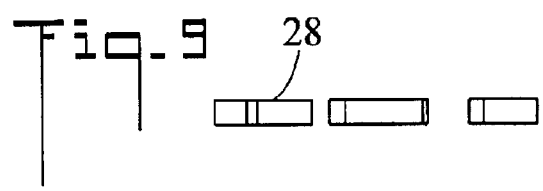
Fig_9
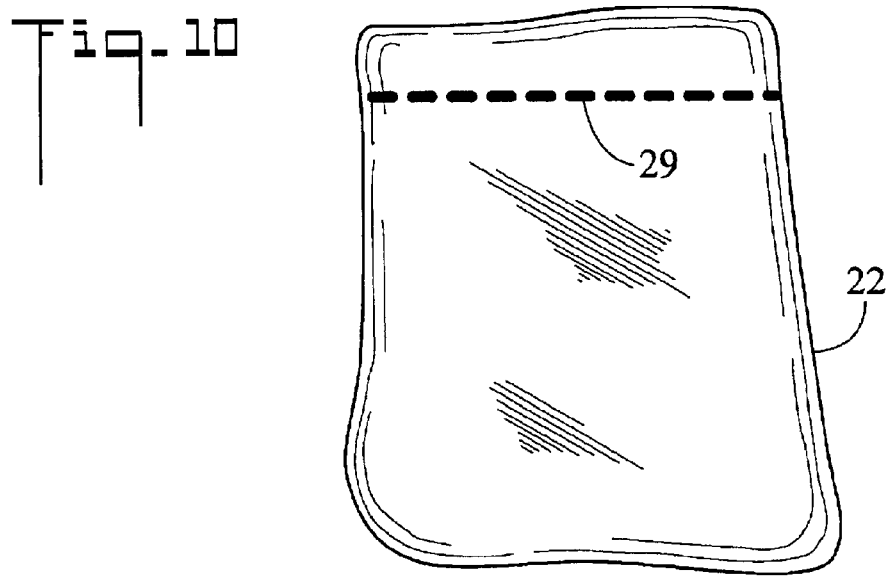
Fig_10
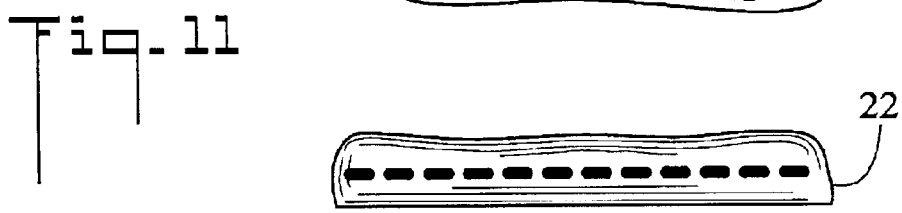
Fig_11

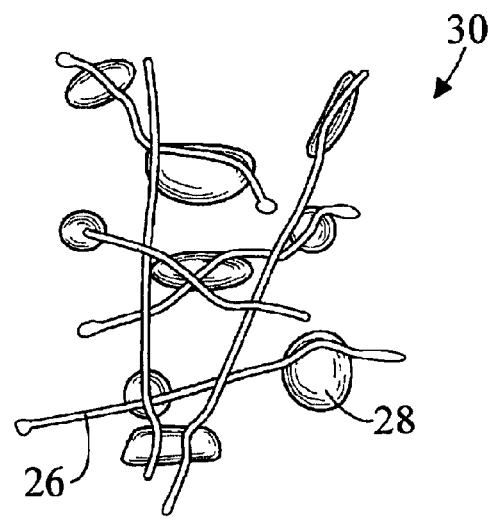
Fig_16
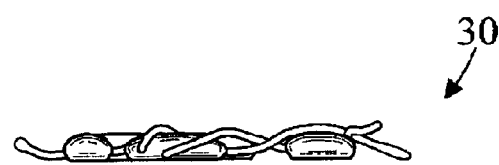
Fig_17
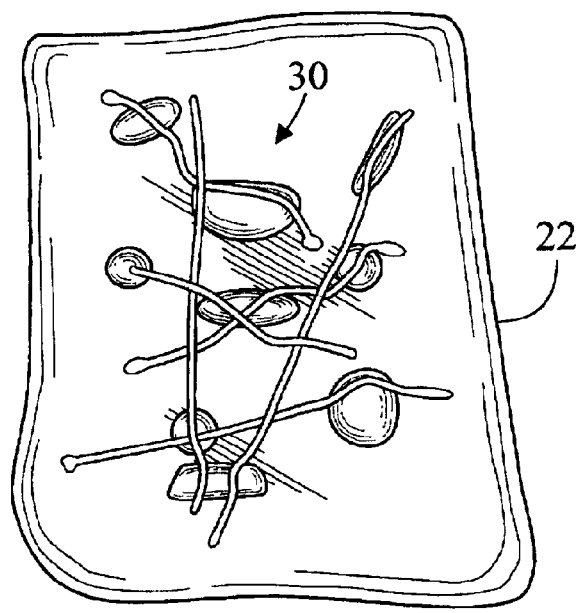
Fig_18

ORNAMENTAL GLASS OBJECT AND METHOD OF FABRICATION

TECHNICAL FIELD

The present invention pertains generally to ornamental objects such as pendants, broaches, necklaces, rings, bracelets, earrings, and the like, and more particularly to ornamental glass objects made out of fuseable glass and a method for making same.

BACKGROUND ART

Glass products and their method of fabrication are well known in the art. For example, U.S. Pat. No. 5,525,137 shows a method for producing bas-relief stained glass using glass ground to a powder. The powdered glass is mixed with a vehicle to produce a paste which is applied to a sheet of glass. The applied layer of paste forms a design on the sheet of glass and has a raised appearance relative to the sheet of glass. The sheet of glass is heated for a period of time at a temperature high enough to bond the powdered glass paste to the sheet of glass, but low enough to prevent permanent deformation of the sheet of glass and to maintain the design formed by the paste on the sheet of glass.

U.S. Pat. No. 5,552,933 illustrates light reflective buttons made from a plurality of fused strata, the top stratum having an exposed reflective area, preferably of pleochroic or dichroic material in a plane. Manufacture of the buttons involves stacking the top stratum with the reflective area exposed on top of a sub-stratum, and then heating the complex to a temperature sufficient to fuse the stack. During fusion, the stack forms a dome with a flat base. Sub-strata may be added to the stack as needed prior to heating for strength and/or aesthetic purposes. Preferably the strata are all glass, with the top stratum being a cut or otherwise shaped piece of sheet glass commonly known as "dichroic glass." For a reflective area comprised of a plane of pleochroic or dichroic crystalline material, the temperature at which fusion of the strata occurs is too low to melt the crystalline plane, and so it is substantially unaffected by the heating. Thus, the reflective area holds its shape and may be incorporated into the button in whatever form is desired. Along with decorative uses, these buttons may be used as safety reflectors mounted on objects or clothing worn by persons or animals. A temperature range of 1400–1450 degrees Fahrenheit is used for partial fusion, and a temperature range of 1550–1650 degrees Fahrenheit is used for total fusion.

DISCLOSURE OF INVENTION

The present invention is directed to glass objects and a method for their manufacture. In a preferred embodiment, the objects comprise articles of jewelry. However, the objects could be used for other decorative purposes as well. The objects are fabricated from various colors of fuseable glass which when heated and then cooled will not crack. Dichroic glass can also be used. Three different glass elements are used to make the objects: a base, elongated stringers, and chips. Also, three different temperatures are used to manufacture the objects: (1) a high temperature for fusing the base, (2) an intermediate temperature for fusing the stringers to the chips to form a pattern, and (3) a low temperature for bonding the pattern to the base. The three temperatures are purposefully selected to result in the proper degree of melting to fuse the elements without turning the end product into a blob.

In accordance with a preferred embodiment of the invention, a method for making an ornamental glass object, comprises:

(a) providing at least one piece of base glass;

(b) providing at least one piece of stringer glass;

(c) providing at least one piece of chip glass;

(d) providing a heating device such as a kiln;

(e) using the heating device to heat the base glass to a first temperature sufficient to partially melt the base glass;

(f) allowing the base glass to cool;

(g) arranging the stringer glass and the chip glass in abutting relationship to form a pattern;

(h) using the heating device to heat the pattern to a second temperature sufficient to partially melt the stringer glass and the chip glass, and to fuse the stringer glass and the chip glass together, the second temperature being lower than the first temperature;

(i) allowing the fused pattern to cool;

(j) placing the fused pattern in abutting relationship with the base glass;

(k) using the heating device to heat the fused pattern and the base glass to a third temperature sufficient to fuse the pattern to the base glass, the third temperature being lower than the second temperature; and, (l) allowing the pattern and the base glass to cool.

In accordance with an important aspect of the invention, the first temperature is about 1549° Fahrenheit, the second temperature is about 1517° Fahrenheit, and the third temperature is about 1443° Fahrenheit.

In accordance with an important feature of the invention, a plurality of pieces of base glass are arranged in abutting relationship so as to form a structure having an aperture.

In accordance with another important aspect of the invention, the pattern is formed by placing the stinger glass on top of the chip glass.

In accordance with another important feature of the invention, the pattern is arranged so that no two pieces of the chip glass touch one another.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a flow diagram of a method for making glass objects in accordance with the present invention;

FIG. 2 is a top plan view of a piece of base glass;

FIG. 3 is a side elevation view of the base glass;

FIG. 4 is a top plan view of a plurality of pieces of base glass arranged in abutting relationship so as to form a structure having an aperture;

FIG. 5 is a side elevation view of the base glass of FIG. 4 showing stacked pieces;

FIG. 6 is a side elevation view of pieces of stringer glass;

FIG. 7 is an end view of the stringer glass;

FIG. 8 is a top plan view of a plurality of pieces of chip glass;

FIG. 9 is a side elevation view of the pieces of chip glass;

FIG. 10 is a top plan view of the base glass of FIG. 2 after it has been heated to effect partial melting;

FIG. 11 is a side elevation view of the heated base glass of FIG. 10;

FIG. 16 is a top plan view of the pattern of FIG. 14 after it has been heated to partially melt the stringer glass and chip glass and to fuse all the glass together;

FIG. 17 is a side elevation view of the fused pattern of FIG. 16;

FIG. 18 is a top plan view of the fused pattern of FIG. 16 placed on top of the base glass of FIG. 10;

MODES FOR CARRYING OUT THE INVENTION

Figure 12:
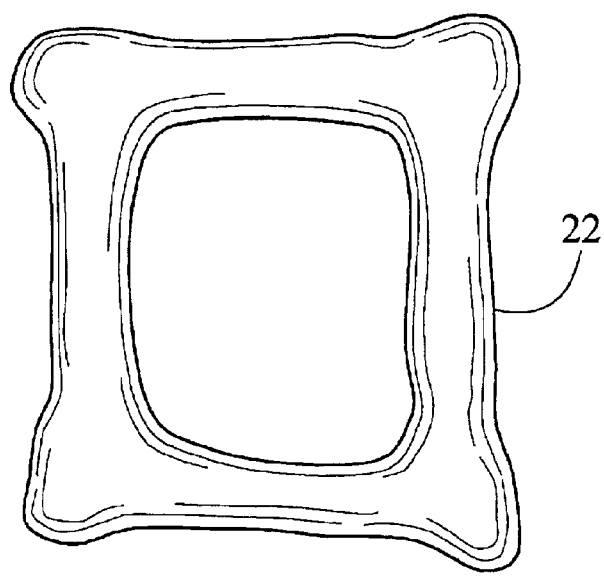
FIG. 12 is a top plan view of the base glass of FIG. 4 after it is heated to effect partial melting.

Referring initially to FIG. 1, there is illustrated a flow diagram of a method for making glass objects in accordance with the present invention, generally designated as 20. The methods include twelve steps identified by the letters "a" to "l."

In step (a) at least one piece of base glass 22 is provided. Referring also to FIGS. 2 and 3, there are illustrated top plan and side elevation views, respectively, of base glass 22 before heating. In the shown preferred embodiment, base glass 22 is a sheet, and in fact two sheets which sandwich a stainless steel rod 500 which is coated in "bead release". After heating (firing), rod 500 is removed using water, thereby leaving a hole which can accept a string or chain. In a preferred embodiment, base glass 22 is between the size of a silver dollar (1½ inches) and a fifty cent piece (1 3/16 inches). FIGS. 4 and 5 illustrate top plan and side elevation views, respectively, of another base having a plurality of pieces of base glass 22 arranged in abutting relationship so as to form a structure having an aperture 24, so that a string or chain may be inserted. While the shown arrangement is a square, it may be appreciated that other shapes such as a hexagon, an octagon, or any regular or irregular shape could also be used. It is noted that one piece of base glass 22 has been placed on top of another piece of base glass 22. This configuration, as opposed to simply abutting the pieces of base glass 22, ensures better fusing when the base glass 22 is heated (refer also to FIG. 12).

In step (b) at least one piece of stringer glass 26 is provided. FIGS. 6 and 7 illustrate side elevation and end views, respectively, of one piece of stringer glass 26. Stringer glass is well known in the art, and includes elongated cylindrical glass members which resemble spaghetti. In a preferred embodiment, the pieces of stringer glass 26 are about 1/64 inch in diameter.

In step (c) at least one piece of chip glass 28 is provided. FIGS. 8 and 9 illustrate top plan and side elevation views, respectively, of a plurality of pieces of chip glass 28. Chip glass 28 is of varying sizes and shapes, ranging from about 1/16 to 5/16 inches across.

In step (d) a heating device such as a kiln is provided.

Figure 13:
FIG. 13 is a side elevation view of the heated base glass of FIG. 12.

In step (e) the heating device is used to heat base glass 22 to a first temperature which is sufficient to partially melt base glass 22. In a preferred embodiment, the first temperature is about 1549° Fahrenheit. In the art, this temperature is equivalent to "015 bar cone." It is noted, however, that other temperatures could also be used, so long as base glass 22 is partially melted to smooth sharp corners and edges. Empirical testing has determined that a temperature of about 1549° Fahrenheit gives superior results. FIGS. 10 and 11 are top plan and side elevation views, respectively, of the base glass 22 of FIG. 2 after it has been heated to effect partial melting. Rod 500 (refer to FIG. 2) has been removed leaving hole 29. FIGS. 12 and 13 are top plan and side elevation views, respectively, of the base glass 22 of FIG. 4 after it has been heated to effect partial melting fusing the individual base glass pieces together.

In step (f) base glass 22 is allowed to slowly cool in an annealing range of about 900° to 500° Fahrenheit to avoid internal stresses which cause cracking.

Figure 14:
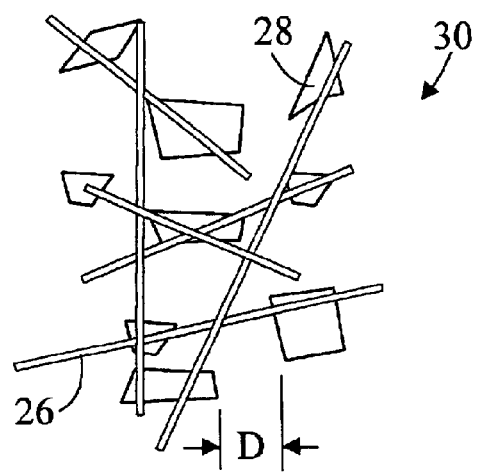
FIG. 14 is a top plan view of the stringer glass and chip glass arranged to form a pattern.
Figure 15:
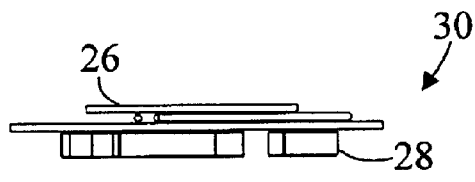
FIG. 15 is as side elevation view of the pattern of FIG. 14.

In step (g) stringer glass 26 and chip glass 28 are arranged in abutting relationship to form a pattern 30. Referring also to FIGS. 14 and 15, there are illustrated top plan and side elevation views, respectively, of a plurality of pieces of stringer glass 26 and a plurality of pieces of chip glass 28 arranged to form pattern 30 wherein each piece of chip glass abuts at least one piece of stringer glass. In a preferred embodiment, stringer glass 26 is placed on top of chip glass 28 in order to form a "draped look" after heating. Also in a preferred embodiment, the plurality of pieces of stringer glass 26 is limited to between about two and six to avoid a cluttered look. The pieces of stringer glass 26 are arranged in overlapped intersecting relationship. Also, to avoid the fusing together of adjacent pieces of chip glass 28, the pieces of chip glass 28 are arranged so that no two pieces touch one another. It has been found that spacing the pieces of chip glass a distance D of between about 0.125 and 0.25 inches apart accomplishes this purpose.

In step (h) the heating device is used to heat pattern 30 to a second temperature sufficient to partially melt the stringer glass 26 and chip glass 28, and to fuse the stringer glass 26 and chip glass 28 together to where they touch and the stringer glass 26 to the stringer glass 26 where they touch. The second temperature is lower than the first temperature. In a preferred embodiment, the second temperature is about 1517° Fahrenheit. In the art, this temperature is equivalent to "016 bar cone." It is noted, however, that other temperatures could also be used so long as stringer glass 26 and chip glass 28 partially melt and fuse together to form pattern 30. Empirical testing has determined that a temperature of about 1517° Fahrenheit gives superior results. FIGS. 16 and 17 are top plan and side elevation views, respectively, of the pattern 30 of FIG. 14 after it has been heated to partially melt the stringer glass 26 and chip glass 28 and to fuse all glass together into pattern 30. Added interest is created by how stringer glass 26 drapes over chip glass 28 and other stringer glass 26.

In step (i), pattern 30 is allowed to slowly cool in an annealing range of about 900° to 500° Fahrenheit to avoid internal stresses which cause cracking.

Figure 19:
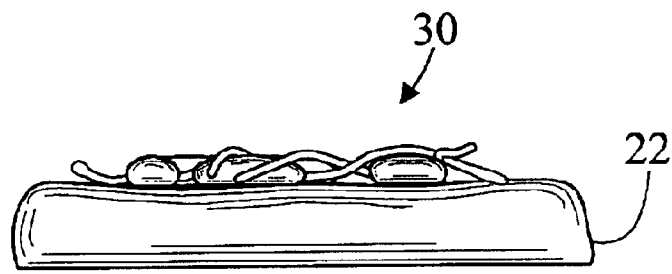
FIG. 19 is a side elevation view of FIG. 18.
Figure 20:
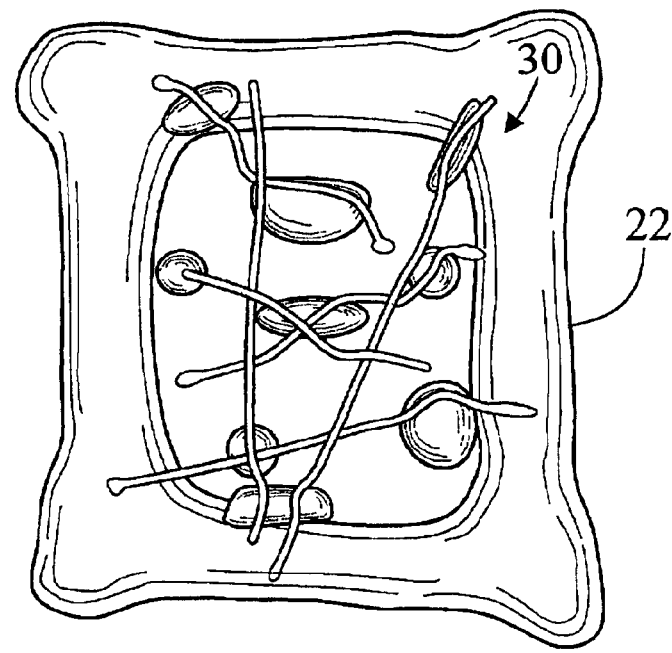
FIG. 20 is a top plan view of the fused pattern of FIG. 16 placed on top of the fused base glass of FIG. 12.

In step (j), pattern 30 is placed in abutting relationship with previously melted base glass 22. Referring to FIGS. 18 and 19, there are illustrated top plan and side elevation views, respectively, of the fused pattern 30 of FIG. 16 placed on top of the fused base glass 22 of FIG. 10. FIG. 20 illustrates fused pattern 30 placed on top of the open structure base glass 22 of FIG. 12.

In step (k), the heating device is used to heat pattern 30 and base glass 22 to a third temperature which is only sufficient to fuse pattern 30 to base glass 22 but not substantially alter the shape of either pattern 30 or base glass 22.

The third temperature is lower than the second temperature. In a preferred embodiment, the third temperature is about 1443° Fahrenheit. In the art, this temperature is equivalent to "017 bar cone." It is noted however that other temperatures could also be used, so long as base glass 22 and pattern 30 are partially melted to effect bonding. Empirical testing has determined that a temperature of about 1443° Fahrenheit gives superior results.

And, in step (l), the pattern 30 fused to base glass 22 is allowed to slowly cool in an annealing range of about 900° to 500° Fahrenheit to avoid internal stresses which cause cracking.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A method for making an ornamental glass object, comprising:
   (a) providing at least one piece of base glass;
   (b) providing at least one piece of stringer glass;
   (c) providing at least one piece of chip glass;
   (d) providing a heating device;
   (e) using said heating device to heat said base glass to a first temperature sufficient to partially melt said base glass;
   (f) allowing said base glass to cool;
   (g) arranging said stringer glass and said chip glass in abutting relationship to form a pattern;
   (h) using said heating device to heat said pattern to a second temperature sufficient to partially melt said stringer glass and said chip glass, and to fuse said stringer glass and said chip glass together, said second temperature lower than said first temperature;
   (i) allowing said pattern to cool;
   (j) placing said pattern in abutting relationship with said base glass;
   (k) using said heating device to heat said pattern and said base glass to a third temperature sufficient to fuse said pattern to said base glass, said third temperature lower than said second temperature; and,
   (l) allowing said pattern and said base glass to cool.

2. The method according to claim 1, wherein in step (e) said first temperature is about 1549° Fahrenheit.

3. The method according to claim 1, wherein in step (h) said second temperature is about 1517° Fahrenheit.

4. The method according to claim 1, wherein in step (k) said third temperature is about 1443° Fahrenheit.

5. The method according to claim 1, further including:
   in step (a) providing a plurality of pieces of said base glass; and,
   prior to step (e) arranging said plurality of pieces of said base glass in abutting relationship so as to form a structure having an aperture.

6. The method according to claim 5, further including:
   placing one piece of said base glass on top of another piece of said base glass.

7. The method according to claim 1, further including:
   in step (g) said pattern formed by placing said stinger glass on top of said chip glass.

8. The method according to claim 1, further including:
   in step (b) providing a plurality of pieces of said stringer glass; and,
   in step (g) said plurality being between two and about six.

9. The method according to claim 1, further including:
   in step (b) providing a plurality of pieces of said stringer glass; and,
   in step (g) overlapping said plurality of pieces of said stringer glass in intersecting relationship.

10. The method according to claim 1, further including:
    in step (c) providing a plurality of pieces of said chip glass; and,
    in step (g) using said plurality of pieces of said chip glass to form said pattern.

11. The method according to claim 10, further including:
    in step (g) arranging said pieces of said chip glass so that no two pieces touch one another.

12. The method according to claim 11, further including:
    spacing said pieces of said chip glass between about 0.125 and 0.25 inches apart.

13. A method for making an ornamental glass object, comprising:
    (a) providing at least one piece of base glass;
    (b) providing a plurality of pieces of stringer glass;
    (c) providing a plurality of pieces of chip glass;
    (d) providing a kiln;
    (e) using said kiln to heat said base glass to about 1549° Fahrenheit;
    (f) allowing said base glass to cool;
    (g) arranging said stringer glass and said chip glass in abutting relationship to form a pattern, wherein (1) each piece of said chip glass abuts at least one piece of said stringer glass, (2) no two pieces of said chip glass touch one another, and (3) said stringer glass is placed on top of said chip glass;
    (h) using said kiln to heat said pattern to about 1517° Fahrenheit;
    (i) allowing said pattern to cool;
    (j) placing said pattern on top of said base glass;
    (k) using said heating device to heat said pattern and said base glass to about 1443° Fahrenheit; and,
    (l) allowing said pattern and said base glass to cool.

* * * * *